Patented Mar. 23, 1943

2,314,636

UNITED STATES PATENT OFFICE 2,314,636

METHOD OF TRANSFERRING HEAT BY A HEAT EXCHANGE LIQUID

Louis L. Slabkowicz, Ann Arbor, Mich., assignor, by mesne assignments, to The Dow Chemical Company, Midland, Mich., a corporation of Michigan No Drawing. Application January 22, 1941, Serial No. 375,455

4 Claims. (Cl. 252—78)

This invention is concerned with a composition of matter suitable for use as a heat transfer medium and for degreasing metals and with a method of transferring heat.

It is an object of the present invention to provide a composition particularly for use in vapor phase heat transfer operations carried out in the range between about 300° and about 450° F. and at low pressure, i. e. below about 25 pounds per square inch gage. Still further objects are to provide a composition which remains liquid when a system in which it is used is not being heated and a medium which does not substantially corrode boilers, condensers, and other similar apparatus. A further object is the provision of a method of transferring heat by a heat exchange liquid.

Orthodichlorobenzene is a satisfactory heat transfer medium so far as heat capacity, freezing point, and boiling point are concerned, but it attacks steel so rapidly, particularly above 300° F., that its use is impractical. It has now been discovered that the composition formed by incorporating with orthodichlorobenzene a small amount of an alcohol of suitable boiling point is an excellent vapor phase heat transfer medium for use in the range of between about 300° F. to about 450° F. Examples of suitable alcohols are cyclohexanol, 2-methyl-cyclohexanol, 4-methyl-cyclohexanol, 2-octanol, 1-heptanol, and the like. In general, alcohols boiling in the range of between about 165° and about 180° C. are satisfactory. The percentage of alcohol admixed with the orthodichlorobenzene may vary from about 0.025 per cent to about 5 per cent or more, by volume. Alcohols of the type specified carry over with the orthodichlorobenzene vapor and prevent corrosion throughout the heat transfer system in which the composition is utilized.

The composition may be used in the heating and cooling of plastic molds, reaction kettles, driers, pickling baths, laundry ironers, and other similar types of apparatus as well as in prime movers, and in domestic and industrial space-heating systems. Orthodichlorobenzene containing one per cent by volume of 4-methyl-cyclohexanol has been satisfactorily used in a steel boiler connected with a laundry ironing machine over periods of many weeks without producing any evidence of corrosion.

I claim

1. In a method of transferring heat by circulating a heat exchange liquid in indirect heat exchange with a body whose temperature is to be regulated, the use of a composition comprising orthodichlorobenzene and from 0.025 per cent to 5 per cent of an alcohol boiling in the temperature range between 165° and 180° C. as said heat exchange liquid.

2. In a method of transferring heat by circulating a heat exchange liquid in indirect heat exchange with a body whose temperature is to be regulated, the use of a composition comprising orthodichlorobenzene and from 0.025 per cent to 5 per cent of cyclohexanol as said heat exchange liquid.

3. In a method of transferring heat by circulating a heat exchange liquid in indirect heat exchange with a body whose temperature is to be regulated, the use of a composition comprising orthodichlorobenzene and from 0.025 per cent to 5 per cent of methyl-cyclohexanol as said heat exchange liquid.

4. In a method of transferring heat by circulating a heat exchange liquid in indirect heat exchange with a body whose temperature is to be regulated, the use of a composition comprising orthodichlorobenzene and from 0.025 per cent to 5 per cent of 2-octanol as said heat exchange liquid.

LOUIS L. SLABKOWICZ.